(12) United States Patent
Lee et al.

(10) Patent No.: US 11,237,309 B2
(45) Date of Patent: Feb. 1, 2022

(54) LENS

(71) Applicant: Rays Optics Inc., Hsinchu County (TW)

(72) Inventors: Chen-Cheng Lee, Hsinchu County (TW); Chen-Yi Tsai, Hsinchu County (TW); Shin-Jen Wang, Hsinchu County (TW); Kuo-Hsiang Hung, Hsinchu County (TW); Chih-Ling Lin, Hsinchu County (TW); Meng-Wei Lin, Hsinchu County (TW); Yu-Chia Lu, Hsinchu County (TW)

(73) Assignee: Rays Optics Inc., Hsinchu County (TW)

( * ) Notice: Subject to any disclaimer, the term of this patent is extended or adjusted under 35 U.S.C. 154(b) by 256 days.

(21) Appl. No.: 16/683,267

(22) Filed: Nov. 14, 2019

(65) Prior Publication Data

US 2020/0249379 A1 Aug. 6, 2020

(30) Foreign Application Priority Data

Feb. 1, 2019 (TW) .................................. 108104240

(51) Int. Cl.
*G02B 5/20* (2006.01)
*G02B 13/14* (2006.01)
*G02B 9/62* (2006.01)

(52) U.S. Cl.
CPC ............... *G02B 5/208* (2013.01); *G02B 9/62* (2013.01); *G02B 13/14* (2013.01)

(58) Field of Classification Search
CPC ........... G02B 5/208; G02B 13/14; G02B 9/62
See application file for complete search history.

(56) References Cited

U.S. PATENT DOCUMENTS

| 8,814,349 B2 | 8/2014 | Quintana |
| 2016/0092731 A1 | 3/2016 | Dainty et al. |
| 2017/0111557 A1 | 4/2017 | Ko et al. |
| 2018/0131853 A1 | 5/2018 | Pellman et al. |

FOREIGN PATENT DOCUMENTS

| TW | 200931977 | 7/2009 |
| TW | I598677 | 9/2017 |
| WO | 2011007435 | 1/2011 |

*Primary Examiner* — Wen Huang
(74) *Attorney, Agent, or Firm* — JCIPRNET

(57) ABSTRACT

A lens including a filter, an aperture stop, and a lens set sequentially arranged along a first direction is provided. The filter includes a central region and a peripheral region. The central region has a first light transmission band for a wavelength range of a visible light and a second light transmission band for a wavelength range of an infrared light. The peripheral region surrounds the central region. The peripheral region has a third light transmission band for the wavelength range of the infrared light and is substantially opaque to the visible light, and an area of one portion of the central region surrounded by the peripheral region is tapered toward the first direction.

20 Claims, 3 Drawing Sheets

LENS

CROSS-REFERENCE TO RELATED APPLICATION

This application claims the priority benefit of Taiwan application no. 108104240, filed on Feb. 1, 2019. The entirety of the above-mentioned patent application is hereby incorporated by reference herein and made a part of this specification.

BACKGROUND

Technical Field

The disclosure generally relates to a lens. More particularly, the disclosure relates to a lens having different F-number (hereinafter called as aperture values) for light having different wavelengths.

Description of Related Art

In the existing image-taking lens design, when the lens is used to take pictures at low illumination at night, the desired small aperture value ranges from 1.0 to 1.8; in the daytime, high resolution is preferred, and the desired large aperture value ranges from 2.2 to 3.0. Therefore, under the demand of both, most of the lenses strike the balance between the two as product specifications, and it is difficult to give consideration to both. In order to meet the needs of the variable aperture, an automatic aperture where the light flux size can be adjusted according to the illumination is added in most cases. However, due to the presence of movable parts, it will be difficult to reduce the cost and volume of the lens to an ideal value. Moreover, when the image-taking lens takes images, stray light are generated, which directly affects the optical imaging quality. In addition, according to the related art, since the position and the value of the aperture are fixed, as to the optical design, the best focus point of the visible light and the infrared light along the optical axis can only be achieved by relying on the correction of special glass material, and it is difficult to achieve full day-night confocal imaging. To accomplish the effect of day-night confocal imaging, a filter switching device is required, or the number of the lenses should be increased. However, either way leads to the increase in the manufacturing cost. Therefore, how to make a lens which features the above, provides good optical quality, and is able to reduce stray light is one of the crucial topics to artisans skilled in the pertinent art.

SUMMARY

The disclosure provides a lens having a specially designed filter structure, so as to have different apertures for light with different wavelengths and improve the optical quality by reducing the stray light.

In an embodiment of the disclosure, a lens including a filter, an aperture stop, and a lens set sequentially arranged along a first direction is provided, wherein the filter includes a central region and a peripheral region. The central region has a first light transmission band for a wavelength range of a visible light and a second light transmission band for a wavelength range of an infrared light. The peripheral region surrounds the central region. The peripheral region has a third light transmission band for the wavelength range of the infrared light and is substantially opaque to the visible light, and an area of one portion of the central region surrounded by the peripheral region is tapered toward the first direction.

In another embodiment of the disclosure, an imaging lens including a filter, a light shielding material layer, and a lens set sequentially arranged along a first direction is provided, wherein the filter includes a first material layer and a second material layer. The first material layer is substantially composed of a material that has a refractive index of N1 and is substantially transparent to a visible light and an infrared light. The second material layer surrounds at least one portion of the first material layer and is substantially composed of a material that has a refractive index of N2 and is substantially opaque to the visible light and the infrared light, wherein N1/N2 is smaller than or equal to 1.05. The first material layer is connected to the second material layer through a ring-shaped interface tapered in an outward manner along the first direction.

In light of the foregoing, a lens having a filter is provided in one or more embodiments of the disclosure, and the filter of the lens has a central region that allows the visible light and the infrared light to pass through and a peripheral region capable of reflecting the visible light. According to said design provided in one or more embodiments of the disclosure, in an optical imaging process, different aperture values for the visible light and the infrared light can be generated, and day-night confocal imaging can still be achieved and good optical imaging quality during the day and at night can be guaranteed in no need of additionally switching the infrared filter. Besides, an area of one portion of the central region surrounded by the peripheral region is tapered toward the first direction, and therefore the visible light is not reflected to a minified side of the lens due to the intersection. As such, the stray light can be reduced, and the optical imaging quality can be improved.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
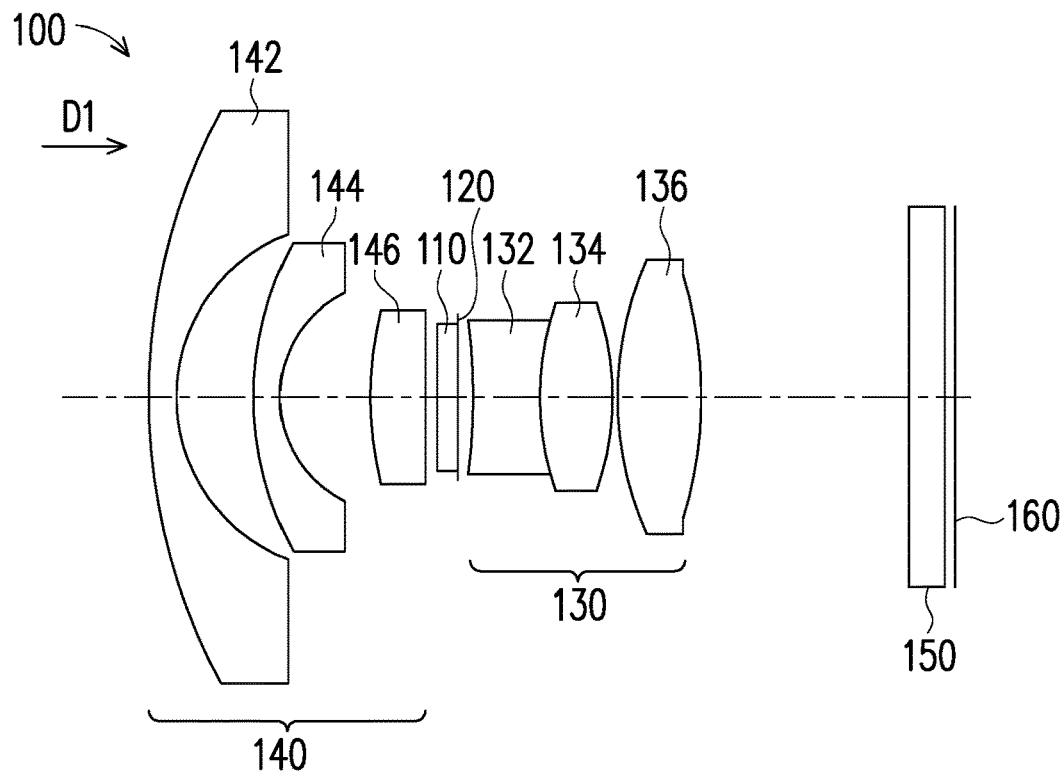
FIG. 1 is a schematic view of a lens according to an embodiment of the disclosure.

FIG. 1 is a schematic view of a lens according to an embodiment of the disclosure. Please refer to FIG. 1. In the present embodiment, a lens 100 including a filter 110, an aperture stop 120, and a lens set 130 sequentially arranged along a first direction D1 is provided. Particularly, the lens 100 can further include another lens set 140 located in front of the filter 10 and including a glass cover 150 and an imaging plane 160. The lens 100 provided in the present embodiment can be applied in an image capturing apparatus (e.g., a camera or a camcorder) as an imaging lens, so as to capture light transmitted along the first direction D1 and form images on the imaging plane 160. Alternatively, in other embodiments, the lens 100 can serve as a projection lens and can be applied to an image projecting device, e.g., a projector or the like, so as to transmit an image light along a direction opposite to the first direction D1 and form an image on an external projection target (not shown), such as a projection screen or a wall, which should not be construed as a limitation in the disclosure.

Figure 2:
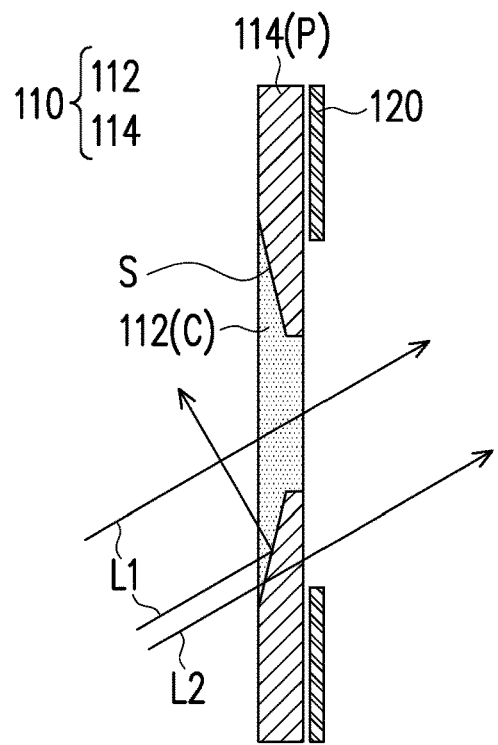
FIG. 2 is a schematic view illustrating a portion of the lens depicted in FIG. 1.

FIG. 2 is a schematic view illustrating a portion of the lens depicted in FIG. 1. Please refer to FIG. 2. The filter 110 is an optical device that allows light having a specific wavelength range to pass through, so as to reflect/absorb light having a wavelength range outside said specific wavelength range. In the present embodiment, the filter 110 has a central region C and a peripheral region P, the peripheral region P surrounds the central region C, and a material of the peripheral region P can be plastic, ink, or a combination thereof, for instance. The central region C has a first light transmission band for a wavelength range of a visible light and a second light transmission band for a wavelength range of an infrared light. The peripheral region P has a third light transmission band for the wavelength range of the infrared light and is substantially opaque to the visible light. That is, the filter 110 provided in the present embodiment is made of at least two different materials, and the at least two different materials having different transmittances for light with different wavelength ranges.

Particularly, in the present embodiment, the filter 110 includes a first material layer 112 and a second material layer 114. The first material layer 112 is substantially composed of a material that has a refractive index of N1 and is substantially transparent to a visible light and an infrared light, e.g., Arton F3500 or another similar material, or say, the first material layer 112 allows at least 70% of a light with wavelength of 550 nm (the said visible light) and a light with wavelength of 850 nm (the said infrared light) to pass therethrough.

The second material layer 114 surrounds at least one portion of the first material layer 112, so that the first material layer 112 serves as the central region C of the filter 110, and that the second material layer 114 serves as the peripheral region P of the filter 110. The second material layer 114 is substantially composed of a material that has a refractive index of N2, is substantially transparent to the infrared light and is substantially opaque to the visible light, e.g., FBX80A or another similar material, and is composed of plastic, ink, or a combination thereof, for instance, or say, the second material layer 114 allows no more than 30% of a light with wavelength of 550 nm (the said visible light) and more than 70% of a light with wavelength of 850 nm (the said infrared light) to pass therethrough. That is, the filter 110 can include at least two different materials; according to the present embodiment, the filter 110 include two different materials, which should not be construed as a limitation in the disclosure. In the present embodiment, the refractive index N1 of the first material layer 112 and the refractive index N2 of the second material layer 114 are substantially equal. In another embodiment, a ratio N1/N2 of the refractive index N1 of the first material layer 112 to the refractive index N2 of the second material layer 114 is smaller than or equal to 1.05. A thickness of the first material layer 112 and a thickness of the second material layer 114 are both within a range from 0.1 mm to 5 mm. In an embodiment, the thickness of the first material layer 112 and the thickness of the second material layer 114 are both within a range from 0.2 mm to 1 mm. In an embodiment, the sum of the thickness of the first material layer 112 and the thickness of the second material layer 114 is approximately within a range from 0.3 mm to 0.5 mm.

The aperture stop 120 is a well-known terminology and thus will not be further explained herein. In the present embodiment, the aperture stop 120 is arranged at a location of the lens 100 where a light beam occupying the smallest area passes through. In the present embodiment, the aperture stop 120 is, for instance, a stop or a light shielding device disposed at a side of the filter 110 facing the first direction D1 and located between the filter 110 and the imaging plane 160. In the present embodiment, the aperture stop 120 is formed on a surface of the filter 110. In another embodiment, the aperture stop 120 and the filter 110 can be separated and independent from each other, and there may be space between the two. The aperture stop 120 is substantially opaque to both visible light and infrared light and is substantially ring shaped with an empty through hole without solid material disposed therein. In still another embodiment, the aperture stop 120 can be a non-transparent optical coating film of another optical device in the lens 100, which should not be construed as a limitation in the disclosure.

Please refer to FIG. 1. The lens sets 130 and 140 are respectively composed of at least one lens that has a refractive power and is adapted to allow light to pass through to form an image on the imaging plane 160, and the lens sets 130 and 140 are respectively disposed at two sides of the filter 110 and the aperture stop 120. For instance, in the present embodiment, the lens set 130 is disposed on back of the filter 110 and the aperture stop 120 and includes a first lens 132, a second lens 134, and a third lens 136. Refractive powers of the first lens 132 to the third lens 136, for instance, are sequentially negative, positive, and positive. The lens set 140 is disposed in front of the filter 110 and the aperture stop 120 and includes a fourth lens 142, a fifth lens 144, and a sixth lens 146. Refractive powers of the fourth lens 142 to the sixth lens 146 are respectively negative, negative, and positive. In the present embodiment, the type of the curved surfaces of the lenses, the curvature radii thereof, the refractive powers thereof, the materials thereof, the Abbe number thereof, and the distance among the lenses can be properly adjusted according to different fields where the lenses are applied, which should not be construed as a limitation in the disclosure.

The glass cover 150 is disposed between the lens set 130 and the imaging plane 160 at a minified side. The glass cover 150 is, for instance, sheet glass, and the imaging plane 160 is, for instance, a light collecting surface of a photo-sensing device (not shown). Light entering the lens 100 is adapted to pass through the glass cover 150, so as to form an image on the imaging plane 160.

Please refer to FIG. 1 and FIG. 2. In the present embodiment, the first material layer 112 acting as the central region C of the filter 110 is connected to the second material layer 114 acting as the peripheral region P of the filter 110 through a ring-shaped interface S tapered in an outward manner along the first direction D1 (i.e., a direction parallel to an optical axis of the lens and from a magnified side to the minified side), as shown in FIG. 2. That is, an area of one portion of the central region C surrounded by the peripheral region P is tapered along the first direction. The first material layer 112 is substantially transparent to the visible light and the infrared light, and the second material layer 114 is substantially opaque to the visible light but transparent to the infrared light; therefore, when the light is being received, the visible light L1 can pass through the first material layer 112 and can be transmitted to and reflected by the second material layer 114, and the infrared light L2 can pass through the first material layer 112 and the second material layer 114. As such, the size of the area formed by the second material layer 114 around the first material layer 112 in the light exiting side can be the substantial aperture value of the visible light L1. If deemed necessary, the filter 110 can be used in an opposite manner, so that the ring-shaped surface S of the filter 110 is tapered toward a direction opposite to the first direction D1.

Figure 3:
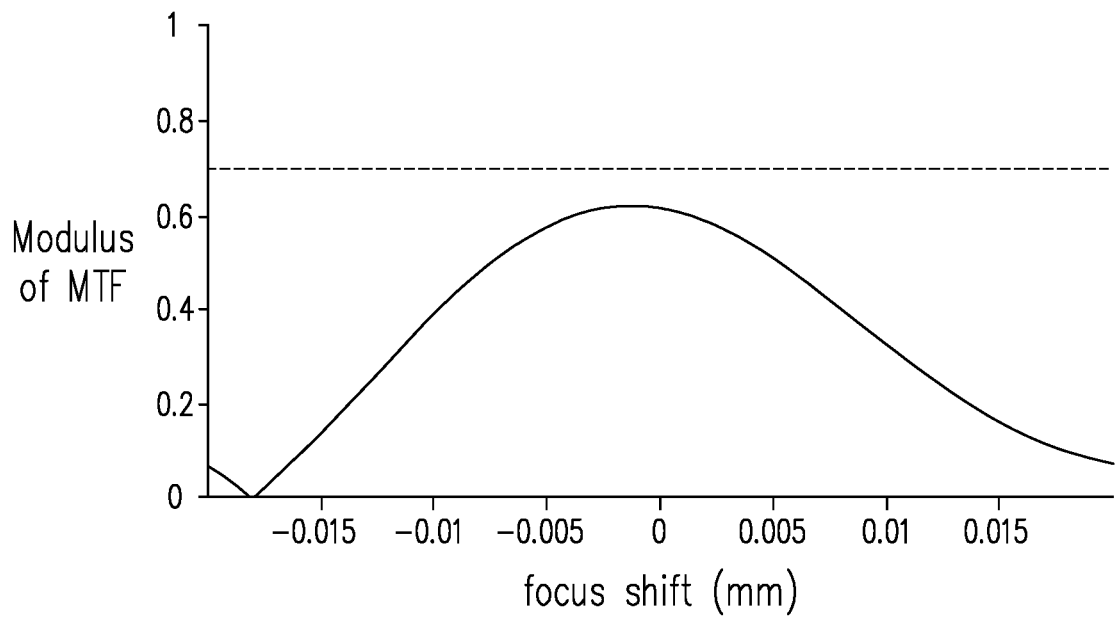
FIG. 3 is a modulate transfer function (MTF) curve showing the lens depicted in FIG. 1 on one condition.
Figure 4:
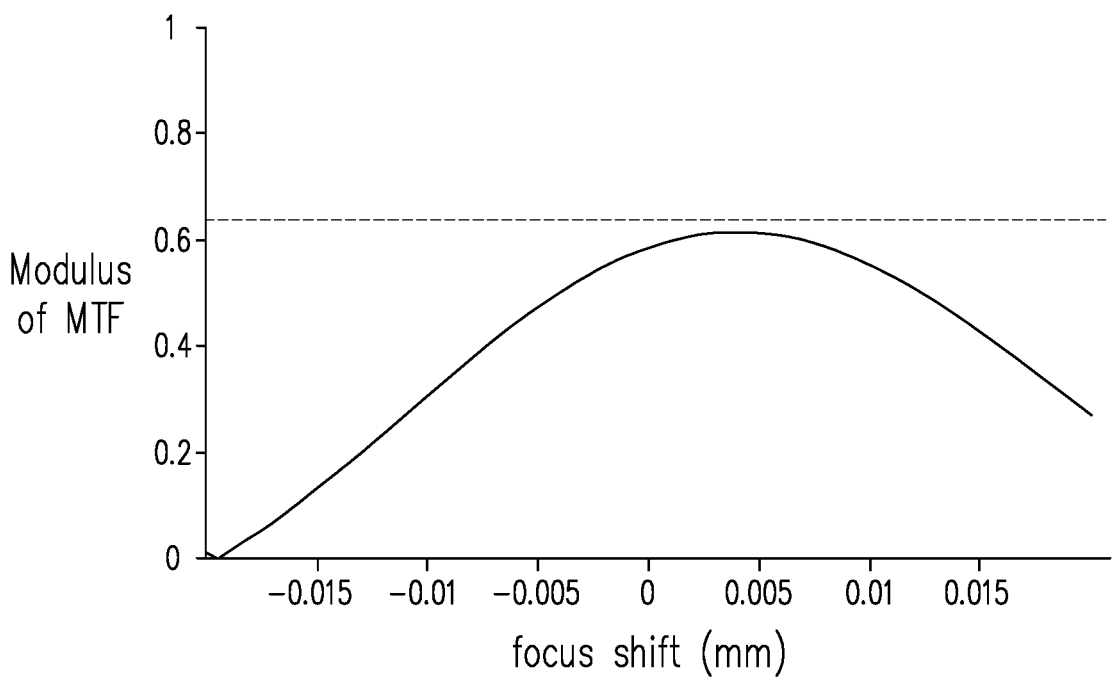
FIG. 4 is an MTF curve showing the lens depicted in FIG. 1 on another condition.

FIG. 3 is a modulate transfer function (MTF) curve showing the lens depicted in FIG. 1 on one condition. FIG. 4 is an MTF curve of the lens depicted in FIG. 1 on another condition. Please refer to FIG. 1 to FIG. 4. FIG. 3 and FIG. 4 are MTF curves showing the infrared light having the wavelength of 850 nm on the condition that the aperture value of the lens 100 for the visible light is 2.4 and 1.8, where the horizontal axis represents a focus shift, and the vertical axis represents a modulus of the MTF. It can be learned from the curves of FIG. 3 and FIG. 4 that the focus shift of the infrared light having the wavelength of 850 nm is 0.004 mm, given that the aperture value for the visible light is 2.4, and the focus shift of the infrared light having the wavelength of 850 nm is −0.001 mm, given that the aperture value for the visible light is 1.8. Hence, the focus shifts differ from each other by 0.005 mm on the two different optical conditions. In the present embodiment, the lens 100 can achieve the effect of day-night confocal imaging and have good optical imaging quality during the day and at night in no need of additionally switching the infrared filter.

In the present embodiment, note that the area of the portion of the central region C surrounded by the peripheral region P is tapered toward the first direction, the ring-shaped interface S connecting the first material layer 112 acting as the central region C and the second material layer 114 acting as the peripheral region P is a cup-shaped surface tapered toward the first direction D1. Hence, when the visible light L1 enters the second material layer 114 of the filter 110, the visible light L1 close to the central optical axis is transmitted toward a direction opposite to the first direction D1 through the ring-shaped interface S, as shown in FIG. 2. Thereby, the visible light L1 is not reflected to the minified side of the lens 100 (i.e., the imaging side of the imaging lens) by the intersection of the first material layer 112 and the second material layer 114, so as to reduce the stray light and enhance the optical imaging quality.

Figure 5:
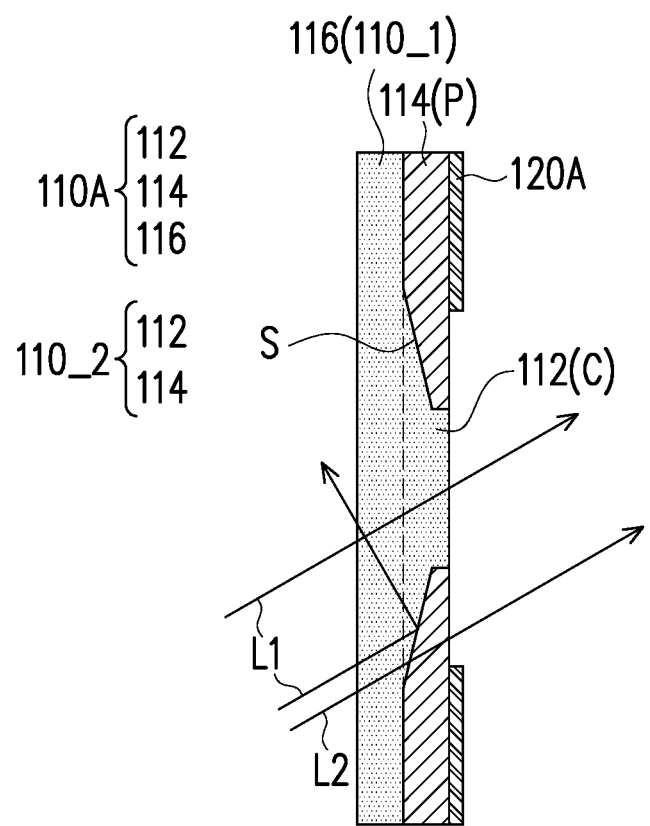
FIG. 5 is a schematic view of a portion of a lens according to another embodiment of the disclosure.

FIG. 5 is a schematic view of a portion of a lens according to another embodiment of the disclosure. Please refer to FIG. 1 and FIG. 5. The filter 110A and the aperture stop 120A provided in the present embodiment can at least be applied to the lens 100 depicted in FIG. 1 in replacement of the filter 110 and the aperture stop 120 depicted in FIG. 2, and the filter 110A and the aperture stop 120A are similar to the filter 110 and the aperture stop 120 depicted in FIG. 2. The difference therebetween lies in that the aperture stop 120A provided in the present embodiment is a light shielding material layer, may be function as an aperture stop, is arranged at the filter 110A, e.g., a non-transparent optical coating film or a light shielding mechanical member, and the light shielding material layer is in contact with the peripheral region P of the filter 110A instead of having an interval (for example, air gap) therebetween.

In the present embodiment, the filter 110A includes a first layer 110_1 and a second layer 110_2, wherein the first layer 110_1 is substantially transparent to the visible light and the infrared light, the second layer 110_2 includes the aforesaid central region C and the aforesaid peripheral region P, and the first layer 110_1 is disposed on one side of the second layer 110_2 opposite to the aperture stop 120A. Particularly, the first layer 110_1 includes the third material layer 116, and the third material layer 116 is composed of a material substantially transparent to the visible light and the infrared light, e.g., Arton F3500. In the present embodiment, the third material layer 116 and the first material layer 112 can be collectively formed and serve as the central region C of the filter 110A. As such, the filter 110A can be further applied into different optical devices and can still achieve same good optical effects.

To sum up, the lens having the filter is provided in one or more embodiments of the disclosure, and the filter of the lens has the central region that allows the visible light and the infrared light to pass through and the peripheral region capable of reflecting the visible light. Hence, in an optical imaging process, different aperture values for the visible light and the infrared light can be generated, and day-night confocal imaging can still be achieved and good optical imaging quality during the day and at night can be guaranteed in no need of additionally switching the infrared filter. Besides, the area of one portion of the central region surrounded by the peripheral region is tapered toward the first direction, and therefore the visible light is not reflected to the minified side of the lens due to the intersection. As such, the stray light can be reduced, and the optical imaging quality can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A lens comprising:
 a filter, an aperture stop, and a lens set sequentially arranged along a first direction, wherein the filter comprises:
  a central region having a first light transmission band for a wavelength range of a visible light and a second light transmission band for a wavelength range of an infrared light; and
  a peripheral region surrounding the central region and having a third light transmission band for the wavelength range of the infrared light, wherein the peripheral region is substantially opaque to the visible light, and an area of one portion of the central region surrounded by the peripheral region is tapered toward the first direction.

2. The lens according to claim 1, wherein a ratio of a refractive index of a material of the central region to a refractive index of a material of the peripheral region is smaller than or equal to 1.05.

3. The lens according to claim 1, wherein the filter comprises a first layer and a second layer, the first layer is substantially transparent to the visible light and the infrared light, the second layer comprises the central region and the peripheral region, and the second layer is disposed between the first layer and the aperture stop.

4. The lens according to claim 3, wherein the first layer is substantially composed of a material having a refractive index of N1, the second layer is substantially composed of a material having a refractive index of N2, N1/N2 is smaller than or equal to 1.05.

5. The lens according to claim 4, wherein a thickness of the first layer and a thickness of the second layer are both within a range from 0.1 mm to 5 mm.

6. The lens according to claim 5, the first layer is connected to the second layer through a ring-shaped interface tapered in an outward manner along the first direction.

7. The lens according to claim 4, wherein the central region allows at least 70% of the visible light and the infrared light to pass therethrough, the peripheral region allows no more than 30% of the visible light and more than 70% of a light with the infrared light to pass therethrough.

8. The lens according to claim 7, wherein the wavelength of the visible light is 550 nm, and the wavelength of the infrared light is 850 nm.

9. The lens according to claim 1, wherein the aperture stop is in contact with the peripheral region of the filter.

10. The lens according to claim 1, wherein the filter and the aperture stop are both located between two lenses with refractive power.

11. A lens comprising:
a filter, a light shielding material layer, and a lens set sequentially arranged along a first direction, wherein the filter comprises:
a first material layer substantially composed of a material having a refractive index of N1, the material of the first material layer being substantially transparent to a visible light and an infrared light; and
a second material layer surrounding at least one portion of the first material layer and substantially composed of a material having a refractive index of N2, the material of the second material layer being substantially opaque to the visible light and substantially transparent to the infrared light, wherein N1/N2 is smaller than or equal to 1.05, and the first material layer is connected to the second material layer through a ring-shaped interface tapered in an outward manner along the first direction.

12. The lens according to claim 11, wherein a thickness of the first material layer and a thickness of the second material layer are both within a range from 0.1 mm to 5 mm.

13. The lens according to claim 12, wherein a sum of a thickness of the first material layer and a thickness of the second material layer is within a range from 0.2 mm to 10 mm.

14. The lens according to claim 13, wherein the second material layer is substantially formed of plastic, ink, or a combination thereof.

15. The lens according to claim 11, wherein the light shielding material layer is in contact with the filter.

16. The lens according to claim 15, wherein the light shielding material layer is substantially ring shaped.

17. The lens according to claim 11, wherein the light shielding material layer is an aperture stop that substantially opaque to both visible light and infrared light.

18. The lens according to claim 11, wherein the first material layer allows at least 70% of the visible light and the infrared light to pass therethrough, the second material layer allows no more than 30% of the visible light and more than 70% of a light with the infrared light to pass therethrough.

19. The lens according to claim 17, wherein the wavelength of the visible light is 550 nm, and the wavelength of the infrared light is 850 nm.

20. The lens according to claim 11, wherein the filter and the aperture stop are both located between two lenses with refractive power.

* * * * *